Sept. 18, 1956 F. WILSON 2,763,286
AUTOMATIC VALVE CONTROL MECHANISM
Filed Aug. 20, 1952 2 Sheets-Sheet 1
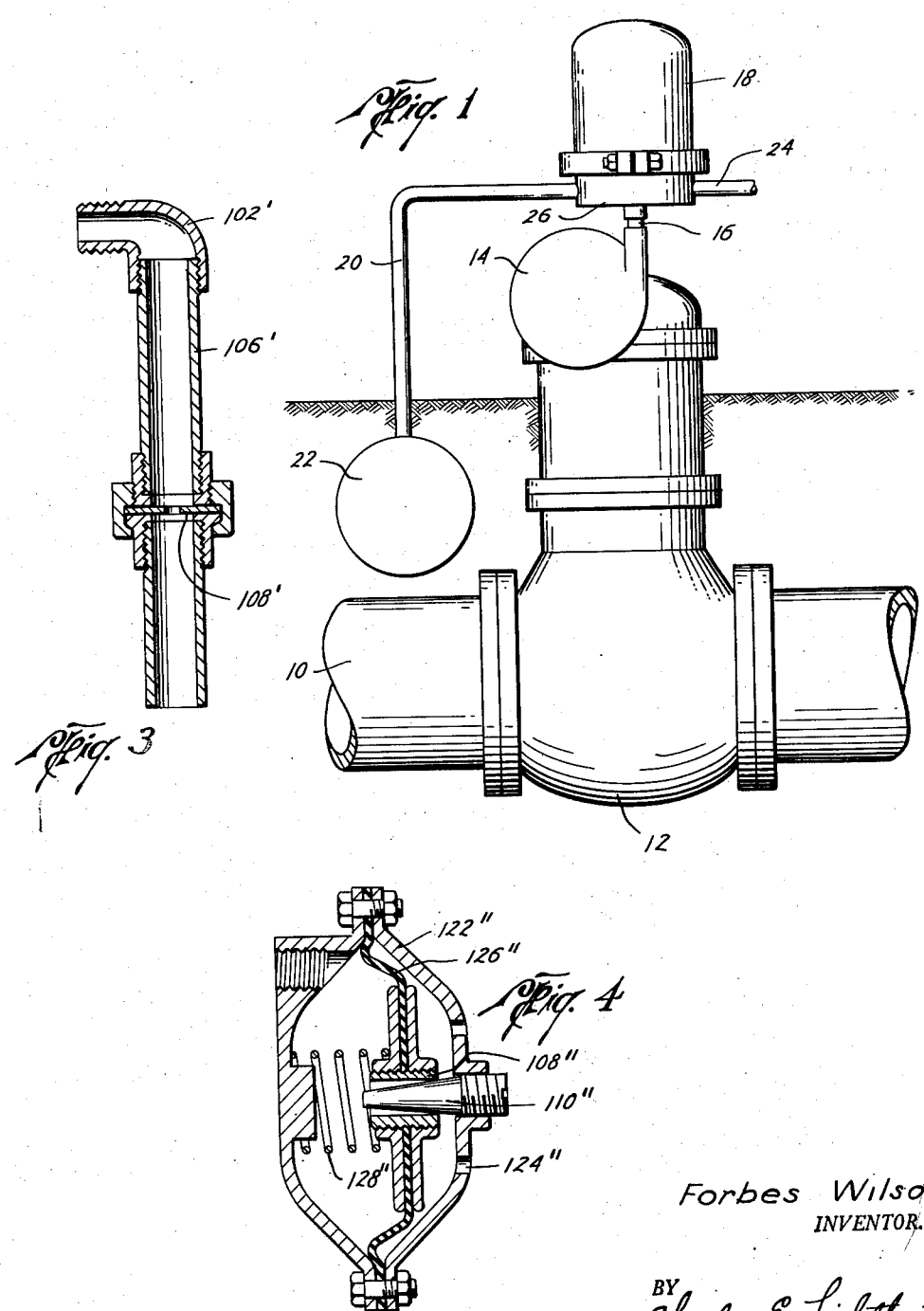
Forbes Wilson
INVENTOR.
BY
Charles E. Lightfoot
ATTORNEY

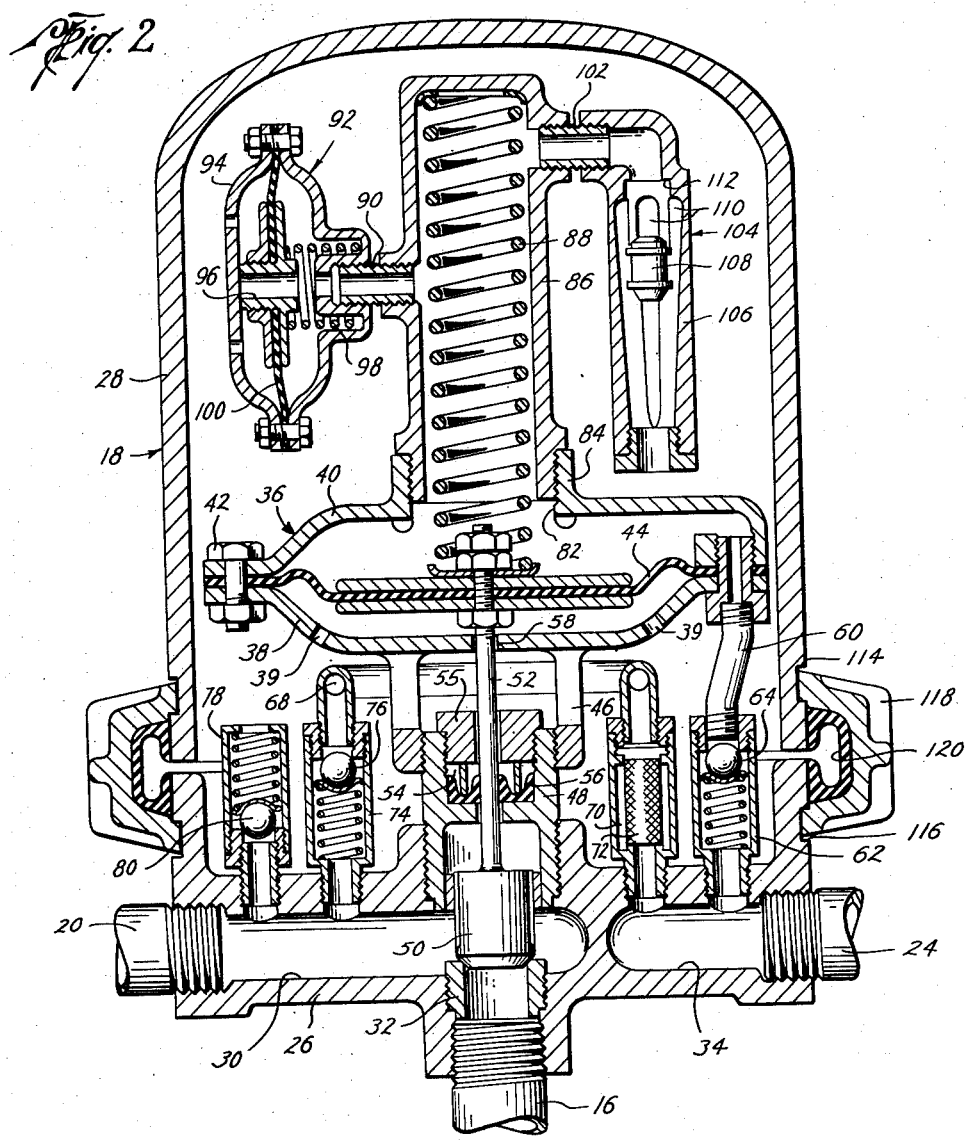

2,763,286
AUTOMATIC VALVE CONTROL MECHANISM

Forbes Wilson, Houston, Tex.

Application August 20, 1952, Serial No. 305,406

7 Claims. (Cl. 137—486)

This invention relates to automatic valve control mechanism and more particularly to mechanism which is operable upon the occurrence of an emergency condition in a fluid system, such as a break in a gas pipe line, to close a shut-off valve in the system.

The invention finds particular application in pipe line systems for the conveyance of gas or other pressure fluids and provides a means which operates automatically to shut off the flow of fluid upon the occurrence of a break, or other emergency condition, in the line, in which a relatively high rate of pressure change takes place.

Fluid systems of the kind referred to are usually provided with shut-off valves at intervals throughout the system for the purpose of shutting off the flow of fluid upon the occurrence of an emergency condition such as a break in the line. Under normal conditions the system is operated with the shut off valves open, the rate of change of the pressure in the system under such conditions being relatively small, and the occurrence of a high rate of change at any point indicates an emergency condition requiring immediate closing of the nearest available shut-off valve.

Various kinds of control mechanism have been proposed heretofore by which the shut-off valves are operated, such mechanism usually including some form of pressure responsive actuating means, such as a flexible diaphragm which operates upon a change of pressure in the system. The use of flexible diaphragms in mechanism of this kind, however, has a number of disadvantages for which no satisfactory solution has heretofore been found. One such disadvantage is that flexible diaphragms are suitable for use only at relatively low pressures, so that pressure reducing means must be employed where the system is operated at high fluid pressures in order to avoid destruction of the diaphragm. Another such disadvantage of mechanism of the diaphragm type is that the diaphragm must have a relatively large effective area because of the low pressure at which it may be operated in order to secure the force and range of movement necessary for the satisfactory operation of the valve.

The present invention has for an important object the provision of pressure responsive valve actuating mechanism by which the above disadvantages may be overcome, which may be used throughout a wide range of different fluid pressure, yet which is operative upon the occurrence of a predetermined rate of pressure change.

Another object of the invention is the provision of valve control mechanism of the type referred to which is responsive to the occurrence of an emergency condition such as a break in a fluid system, such as a gas pipe line, to cause the actuation of a shut-off valve to shut off the flow of fluid.

Another object of the invention is the provision of valve control mechanism having pressure change responsive means constructed as a completely enclosed unit, adaptable for application to fluid systems wherever such a device is needed and which is readily accessible for purposes of maintenance and repair.

A further object of the invention is to provide valve control mechanism for use in fluid systems which is of compact design and simple construction, which operates automatically and which is capable of delivering long trouble free service without attention.

The above and other important objects and advantages of the invention will best be understood from the following detailed description, constituting a specification of the same, when considered in conjunction with the annexed drawings, wherein—

Figure 1 is a side elevational view illustrating the application of the invention to a pressure fluid system and showing a portion of a pipe line with a shut-off valve and control mechanism therefor connected into the line;

Figure 2 is a vertical, central, cross-sectional view on a somewhat enlarged scale, showing the structure and arrangement of parts of the pressure responsive mechanism of the invention;

Figure 3 is a detail view illustrating one form of pressure fluid flow control means used in the invention; and Figure 4 is a detail view on a somewhat enlarged scale illustrating another form of fluid flow control means employed in the invention.

Referring now to the drawings in greater detail, the invention is illustrated in connection with its application to a fluid system which includes a pipe line indicated at 10, having a shut-off valve of conventional construction whose casing is shown at 12 connected into the line and by which the flow of fluid through the line may be shut off. Valve operating means such as the fluid motor indicated at 14 is applied to the shut-off valve in the usual manner for operating the same to close the line. The motor 14 is connected by a pipe 16 to the housing 18 of the pressure responsive control mechanism of the invention, which in turn is connected by a pipe 20 with a source of fluid pressure, such as a pressure storage tank 22, and by a pipe 24 with the pipe line 10.

The pressure responsive mechanism includes the housing 18, which is constructed with a base 26 and a cover 28, which is removably mounted on the base and has a fluidtight connection therewith. The base 26 has a fluid passageway 30 therein which is connected in communication with the pipe 20 leading to the pressure storage tank 22, and within which passageway a valve seat member 32 is threadably secured to the base, the valve seat being in communication with the pipe 16 leading to the fluid motor 14. The base 26 also has a separate fluid passageway 34 with which the pipe 24 leading to the pipe line 10 is connected in communication.

Within the housing 18 there is an actuating diaphragm casing 36, which is preferably formed in two parts 38 and 40 suitably secured together, as by means of bolts 42, and between which a flexible diaphragm 44 is secured. The part 38 of the diaphragm casing 36 is formed with a centrally disposed extension 46 to the outer end of which a tubular connector member 48 is threadably attached, which member is threadably connected to the base 26 in communication with the passageway 30 and supporting the diaphragm casing on the base.

A control valve 50 works within the connector member 48, extending into the passageway 30 to open and close the valve seat 32 to control the flow of pressure fluid from the storage tank 22 to the valve operating motor 14. The control valve 50 has a stem 52 which extends through a packing gland 54 within which suitable packing 56 surrounds the stem and is retained in the gland by a gland nut 55. The stem 52 extends into the diaphragm casing through a centrally disposed opening 58 in the part 38, and is connected to the diaphragm 44 centrally thereof for movement with the diaphragm to open and close the control valve. The part 38 of the diaphragm casing has one or more openings 39 therein, through which fluid from the interior of the housing may enter the diaphragm casing beneath the diaphragm 44.

The interior of the diaphragm housing above the diaphragm 44 is in communication with the passageway 34 through a connecting tube 60, which is connected to the base 26 by an enlarged tubular coupling member 62, and enclosed in the member 62 there is an outwardly opening check valve 64, which closes against the flow of fluid from the passageway 34 into the diaphragm casing above the diaphragm 44, but which may open to permit outflow of fluid therefrom to the passageway 34.

There is also a pipe 68, which is connected at one end in communication with the passageway 34 through a coupling member 70 within which a strainer 72 may be enclosed, the pipe 68 being connected at its other end in communication with the passageway 30 by a coupling member 74 enclosing a check valve 76 which opens to permit the flow of fluid from the passageway 34 to the passageway 30, but closes against the flow of fluid in the opposite direction.

The interior of the housing 18 is in communication with the passageway 30 through a coupling member 78 in which is located a check valve 80 which closes against outflow of fluid from the housing into the passageway 30, but opens to allow the flow of fluid into the housing from the passageway 30.

The part 40 of the diaphragm casing has a centrally disposed opening 82 therein, which is surrounded by an outwardly-projecting, internally-threaded annular flange 84 into which a tubular extension 86 is threadably received connected in communication with the interior of the casing. The extension 86 is closed at its outer end and encloses a resilient member, such as the coiled spring 88, which reacts against the outer end of the extension and the diaphragm 44 to yieldably urge the diaphragm in a direction to close the valve 50 on the seat 32.

Connected in communication with the interior of the extension 86, through a suitable connection, such as the pipe 90 there is a relief valve 92, which in the present illustration is of the diaphragm type, adapted to open under the influence of pressure in the housing 18 to permit fluid to flow from the housing into the diaphragm casing above the diaphragm 44, upon an increase in the pressure in the housing above a predetermined value. The relief valve may have a two part casing 94 in which the diaphragm 100 works, the diaphragm carrying a tubular valve member 96 adapted to seat on the casing under the influence of a resilient member 98, which urges the diaphragm 100 in a direction to close the valve against the flow of fluid from the housing into the extension 86. The casing 94 is provided with inlet openings through which pressure fluid may enter the casing from inside the housing 18, to move the diaphragm 100 against the pressure of the member 98, to open the valve when the pressure in the housing exceeds a predetermined value, thereby preventing damage from subjecting the diaphragm 44 to excessive differential pressure. Some leakage may take place from the housing into the extension 86 through the valve 92, for a purpose to be hereinafter more fully explained.

The extension 86 is also connected in communication through a pipe 102 with a rate-of-flow sensing device indicated at 104. The pressure sensing device takes the form of a tubular body 106 which opens at its lower end into the inside of the housing 18, and within which a sliding plug 108 is movably disposed. The body 106 is provided with internal flutes 110, which are tapered longitudinally so that spaces are formed about the plug 108 which are larger at the top of the tube than at the bottom of the tube, and through which fluid may by pass the plug. The plug 108 is preferably formed of light weight material, such as aluminum, and the body has a counterbore providing an internal annular seat 112 therein with which the plug is engageable at the limit of its upward movement in the body to close the body against the flow of fluid from the housing 18 into the extension 86 when the rate of flow from the housing exceeds a predetermined value. The pressure sensing device as described above constitutes in effect a variable orifice, which is adapted to open wider upon an increase in the pressure in the housing 18 to permit fluid to flow from the housing into the extension 86, but which is closed by engagement of the plug 110 with the seat 112 when the rate of flow from the housing exceeds a predetermined value.

The base 26 and cover 28 of the housing may be provided with external annular grooves 114 and 116, respectively, for the reception of a removable coupling ring 118 by which these parts are secured together. Suitable packing means such as the seal ring 120, formed of rubber or the like is disposed within the ring to form a fluid tight seal between the cover 28 and the base 26.

In Figure 3 there is illustrated a modified form of the pressure sensing device in which a simple orifice plate 108' suitably positioned in a tube 106', takes the place of the plug 108 and the internally fluted body 106 previously described. The tube 106' is connected at one end in communication with the extension 86 by a threaded elbow 102' and is open at its other end into the interior of the housing.

The orifice in the orifice plate 108' is of a predetermined size to limit the rate of flow of fluid from the housing into the extension 86, and thereby develop differential pressure across diaphragm 44 at a predetermined rate of flow through the orifice.

A further modification of the pressure sensing device is shown in Figure 4, wherein a diaphragm operated valve member 108" of tubular form seats upon a tapered member 110". The casing 122" of this form of the sensing device has an opening 124" on one side of the diaphragm 126", through which fluid from the housing may enter. The diaphragm 126" is biased by a spring 128" in a direction to close the valve 108". The casing is connected on the opposite side of the diaphragm by a passageway 102" in communication with the extension 86. Upon an increase in pressure within the housing fluid enters the opening 124" and moves the diaphragm against the spring 128" to increase the opening between the valve 108" and the tapered member 110".

The invention is applied to a pressure fluid system, such as a gas pipe line in the manner shown in Figure 1, with the pipe 24 in communication with the line 10 and the passageway 34 of the base 26 of the housing, and the pipe 20 in communication with the storage tank 22 and the passageway 30 of the base 26. The pipe 16 is also connected in communication with the fluid power motor 14. With the device connected as described, fluid from the line 10 enters the passageway 34 from whence it flows through the pipe 68, passageway 30 and pipe 20 to fill the storage tank 22. Fluid also flows through the passageway 30 to enter the housing 18 through the coupling member 78, and thence to the upper side of the diaphragm 44 through the rate-of-flow sensing device 104.

In this condition of the device the pressure within the housing becomes substantially the same as that in the line 10 and since fluid may enter the diaphragm casing through the openings 39 beneath the diaphragm 44, the pressure will be the same on both sides of the diaphragm and the spring 88 will hold the valve 50 closed on the seat 32, thus shutting off the pressure from the fluid motor 14.

In the normal operation of the system the main valve 12 of the line 10 is open and the control mechanism is in the condition shown in Figure 2, with the valve 50 closed. Variations in the pressure in the line 10, due to normal conditions of demand on the system will result in relatively slow changes in pressure in the control mechanism, so that upon a decrease in pressure in the line 10, fluid may flow from the storage tank 22 into the housing 18 through the coupling member 78, from the interior of the housing through the sensing device 104 into the diaphragm casing above the diaphragm 44, and thence out through the pipe 60 and pipe 24 into the line, until the pressure in the control mechanism falls to that in the line. Sensing device 104 is designed so that for normal line fluctuations the movable plug 108, will rise part way up the tube 106 until the annular tapered flutes 110 are of sufficient flow area to allow the fluid to pass the plug 108 without further movement of the plug 108 and without closure of plug 108 against the seat 112. Similarly, if there is an increase in the pressure in line 10, fluid may flow through pipe 24, passageway 34, pipe 68, passageway 30 and pipe 20 into storage tank 22, and also from passageway 30 through coupling member 78 into the housing 18 until the pressure in the control mechanism reaches that in the line.

In the event, however, that an emergency condition should arise in the line 10, such as a break in the line on the either side of the main valve 12, the fluid in the diaphragm casing above the diaphragm 44 will exhaust rapidly through pipe 60, passageway 34 and pipe 24 into the line, and fluid from the tank 22 will enter the housing, causing the plug 108 to rise in tube 106, until the plug seats on the seat 112 to close the tube 106 against further flow of fluid from the housing into the diaphragm casing above the diaphragm 44, resulting in a higher pressure beneath the diaphragm than above the same and causing the diaphragm to move upwardly against the spring 88 to open the valve 50. Fluid from the storage tank 22 then passes through pipe 16 to the motor 14 and the motor is operated to close the main valve 12. After the plug 108 has been seated on the seat 112, should the pressure continue to rise in the housing to a point at which the pressure in the casing 36 beneath the diaphragm 44 might cause damage to the diaphragm, then the relief valve 92 will be opened against the pressure of the spring 98, to permit fluid in the housing to pass into the extension 86 above the diaphragm 44, to equalize the pressure on the diaphragm.

It is to be noted that during normal pressure decreases in the line 10 the flow of fluid from the housing 18 through the sensing device 104 takes place relatively slowly so that the plug 108 may move upwardly to permit an increased rate of flow, but does not seat on the seat 112 to stop the flow of fluid into the diaphragm casing above the diaphragm 44. Upon the occurrence of a sudden drop in the pressure in line 10, however, the increase in the rate of outflow of fluid from the diaphragm casing above the diaphragm causes the plug 108 to move to closing position, thus causing the pressure to be rapidly exhausted from above the diaphragm so that pressure below the diaphragm from the housing moves the diaphragm upwardly to open the valve 50.

When the condition which has caused the sudden drop in the pressure line 10, such as a break in the line, has been removed, fluid from the line may again enter the passageway 34 and flow through pipe 68, passageway 30 and pipe 20, as previously described to refill the storage tank 22. The fluid will then also flow through passageway 30 to enter the housing 18 through the coupling member 78 and thence to the upper side of the diaphragm 44 through the sensing device 104, so that the pressure above and beneath the diaphragm will be the same and the valve 50 will then be closed.

When the pressure above the diaphragm 44 has been exhausted, there will be some leakage of pressure from the housing through the relief valve 92 into the extension 86 above the diaphragm, whereupon the pressure will become equalized on the plug 108, to permit the plug to move downwardly under the influence of gravity away from seat 112 to again open the sensing device 104. In the event that such leakage should fail to take place, the plug 108 may be moved downwardly when the housing is opened for the purpose of inspecting the condition of the apparatus.

In place of the pressure storage tank 22, the pipe 30 may be connected in communication with the line 10, preferably at a point in advance of the main valve 12 to furnish the pressure required for the operation of the motor 14.

It will be seen that the invention, as described above provides valve control mechanism which is self-contained, simple in design and rugged in construction, and which is capable of use at widely varying line pressures without danger of damaging the valve operating diaphragm.

The invention has been disclosed in connection with a specific embodiment of the same, but it will be understood that this is intended by way of illustration only and that numerous changes can be made in the construction and arrangement of the various parts without departing from the spirit of the invention or the scope of the appended claims.

Having thus clearly shown and described the invention, what is claimed as new and desired to secure by Letters Patent is:

1. Pressure responsive control mechanism comprising a diaphragm casing, a flexible diaphragm in the casing and having an operating connection with a member to be actuated, a pressure housing enclosing said casing and having an inflow connection in communication with the interior of the housing and with a source of pressure fluid, means in said inflow connection operable upon a decrease in the pressure from said source to close said inflow connection against outflow of fluid therethrough from said housing, said housing being in communication with said casing on opposite sides of said diaphragm, means operable upon a predetermined rate of decrease in the pressure from said source to cut off the flow of fluid from said housing into said casing on one side of the diaphragm, means forming an outflow connection in communication with said casing on said one side of said diaphragm and with said source, and means in said outflow connection closing said outflow connection against inflow of fluid from said source to said casing, said last named means being operable upon said predetermined rate of decrease in the pressure from said source to open said outflow connection to reduce the pressure on said one side of the diaphragm to cause the diaphragm to actuate said member.

2. Pressure responsive control mechanism comprising a diaphragm casing, a flexible diaphragm in the casing and having an operating connection with a member to be actuated, a pressure housing enclosing the casing, means forming an inflow connection in communication with the interior of the housing and with a source of pressure fluid, means in said inflow connection closing the inflow connection against outflow of fluid from the housing, means forming an outflow connection in communication with the interior of said casing on one side of said diaphragm and with said source, means in said outflow connection closing said outflow connection against inflow of fluid therethrough from said source and operable upon a decrease in the pressure from said source to open said outflow connection, said casing having an opening through which fluid in the housing may enter the casing on the other side of said diaphragm, means forming an inlet connection in communication with said housing and with the interior of said casing on said one side of said diaphragm, and means in said inlet connection responsive to the rate of outflow of fluid through said outflow connection to close said inlet connection to cause a reduction in pressure in said casing on said one side of said diaphragm to cause the diaphragm to actuate said member.

3. Pressure responsive control mechanism comprising a diaphragm casing, a flexible diaphragm in the casing and having an operating connection with a member to be actuated, a pressure housing enclosing said casing and having an inflow connection in communication with the interior of the housing and with a source of pressure fluid, means in said inflow connection operable upon a decrease in the pressure from said source to close said inflow connection against outflow of fluid therethrough from said housing, said casing having an opening through which fluid in the housing may enter the casing on one side of said diaphragm, means forming an inlet connection in communication with said housing and with the interior of said casing on the other side of said diaphragm, means forming an outflow connection in communication with the interior of said casing on said other side of said diaphragm and with said source, means in said outflow connection closing said outflow connection against inflow of fluid therethrough from said source and operable upon a predetermined rate of decrease in the pressure in said source to open said outflow connection, and means in said inlet connection for varying the flow of fluid from the housing into the casing through said inlet connection and operable upon a decrease of pressure from said source to increase the rate of flow through said inlet connection said last named means being operable upon a predetermined increase in the rate of flow through said inlet connection to close the inlet connection.

4. Pressure responsive control mechanism comprising a diaphragm casing, a flexible diaphragm in the casing and having an operating connection with a member to be actuated, a pressure housing enclosing said casing and having an inflow connection in communication with the interior of the housing and with a source of pressure fluid, means in said inflow connection operable upon a decrease in the pressure from said source to close said inflow connection against outflow of fluid therethrough from said housing, said casing having an opening through which fluid in the housing may enter the casing on one side of said diaphragm, means forming an inlet connection in communication with said housing and with the interior of said casing on the other side of said diaphragm, means forming an outflow connection in communication with the interior of said casing on said other side of said diaphragm and with said source, means in said outflow connection closing said outflow connection against inflow of fluid therethrough from said source and operable upon a decrease in the pressure in said source to open said outflow connection and means in said inlet connection for varying the flow of fluid through said inlet connection in response to a change in pressure from said source and operable upon a predetermined increase in the rate of flow through said inlet connection to close said inlet connection against the flow of fluid therethrough into said casing.

5. Pressure responsive control mechanism comprising a diaphragm casing, a flexible diaphragm in the casing and having an operating connection with a member to be actuated, a pressure housing enclosing said casing and having an inflow connection in communication with the interior of the housing and with a source of pressure fluid, means in said inflow connection operable upon a decrease in the pressure from said source to close said inflow connection against outflow of fluid therethrough from said housing, said casing having an opening through which fluid in the housing may enter the casing on one side of said diaphragm, means forming an inlet connection in communication with said housing and with the interior of said casing on the other side of said diaphragm, means forming an outflow connection in communication with the interior of said casing on said other side of said diaphragm and with said source, means in said outflow connection closing said outflow connection against inflow of fluid therethrough from said source and operable upon a predetermined rate of decrease in the pressure in said source to open said outflow connection, and means in said inlet connection operable upon said predetermined rate of decrease in the pressure in said source for restricting the flow of fluid therethrough.

6. Pressure responsive control mechanism comprising a diaphragm casing, a flexible diaphragm in the casing and having an operating connection with a member to be actuated, a pressure housing enclosing said casing and having an inflow connection in communication with the interior of the housing and with a source of pressure fluid, means in said inflow connection operable upon a decrease in the pressure from said source to close said inflow connection against outflow of fluid therethrough from said housing, said casing having an opening through which fluid in the housing may enter the casing on one side of said diaphragm, means forming an inlet connection in communication with said housing and with the interior of said casing on the other side of said diaphragm, means forming an outflow connection in communication with the interior of said casing on said other side of said diaphragm and with said source, means in said outflow connection closing said outflow connection against inflow of fluid therethrough from said source and operable upon a decrease in the pressure in said source to open said outflow connection, and means in said inlet connection for controlling the flow of fluid therethrough in response to variations in the pressure from said source.

7. Pressure responsive control mechanism comprising a diaphragm casing, a flexible diaphragm in the casing and having an operating connection with a member to be actuated, conduit means connecting the casing with a source of pressure fluid to admit pressure fluid from said source to the casing on opposite sides of said diaphragm, means operable to close said conduit means against back flow of fluid from said casing to said source, means connecting said casing at one side of said diaphragm in communication with a pressure fluid flow line, and means connected in communication with said casing at the other side of said diaphragm and with said source and operable upon a predetermined rate of decrease in the pressure in said flow line to restrict the flow of fluid from said source to said other side of said diaphragm.

References Cited in the file of this patent
UNITED STATES PATENTS

| | | |
|---|---|---|
| 1,745,059 | Rush | Jan. 28, 1930 |
| 2,158,068 | Grove | May 16, 1939 |
| 2,309,848 | King | Feb. 2, 1943 |
| 2,454,653 | Kamp | Nov. 23, 1948 |